Dec. 4, 1951 J. D. REID 2,577,035

UNIVERSAL PHONOGRAPH TURNTABLE

Filed March 1, 1949 4 Sheets-Sheet 1

INVENTOR.
JOHN D. REID.

BY Alden D. Redfield,
Charles Marshall Hogan,
ATTYS.

UNIVERSAL PHONOGRAPH TURNTABLE

Filed March 1, 1949 4 Sheets-Sheet 2

INVENTOR.
JOHN D. REID.
BY
Alden D. Redfield,
Charles Marshall Hogan,
ATTYS.

UNIVERSAL PHONOGRAPH TURNTABLE

Filed March 1, 1949 4 Sheets-Sheet 3

INVENTOR.
JOHN D. REID.
BY
Alden D. Redfield,
Charles Marshall Hogan,
ATTYS.

INVENTOR.
JOHN D. REID.
BY Alden D. Redfield.
Charles Marshall Hogan.
ATTYS.

Patented Dec. 4, 1951

2,577,035

UNITED STATES PATENT OFFICE 2,577,035

UNIVERSAL PHONOGRAPH TURNTABLE

John Drysdale Reid, Cincinnati, Ohio, assignor to Avco Manufacturing Corporation, Cincinnati, Ohio, a corporation of Delaware Application March 1, 1949, Serial No. 78,949

3 Claims. (Cl. 274—39)

The present invention relates to phonograph turntables, and specifically to a novel phonograph turntable which is adapted for use with any one of the three standard types of phonograph record discs presently being commercially manufactured and sold in substantial quantities.

At the present time the availability of, and the strong business competition between, three distinct types of record discs has imposed a severe hardship on the consuming public, in that no turntable heretofore offered for sale has the capacity to handle, without adjustment, the three types of the records. The primary object of the present invention is to relieve the public of the burden of purchasing two or three distinct types of turntables, or the inconvenience of utilizing adapters and the like or of making complicated adjustments which are beyond the technical understanding of many consumers and an annoyance to all.

The well-known standard 10-inch, 78 revolutions per minute (R. M. P.) record disc (hereinafter referred to as a "conventional" disc) generally comprises a thin, flat, circular piece of a suitable composition material adapted to receive and retain impressions which are translated into audible sensations. The standard disc has an outside diameter of approximately 10 inches, for example. It comprises: (1) an inner circular area approximately 3 inches in diameter, on which is superimposed a label; (2) a stopping groove area which consists of a ring outside of the label area and approximately ⅝ inch in width, on which is impressed a spiral record groove comprising a few turns, at least a part of which groove is followed by the pickup needle at the termination of the program; (3) the principal sound track area, a ring approximately 2.34 inches in width (for three minutes' playing time) located radially outwardly of the stopping groove area, on which the main sound track or groove is impressed, which groove is followed by the needle or stylus when the program is played; (4) an outer starting groove area or ring approximately $\frac{3}{16}$ inch in width on which the starting groove is impressed, in the form of a spiral comprising one turn or so, for the purpose of leading the pickup needle to the main recorded area; (5) a center hole which is approximately ¼ inch in diameter.

Recently there have been developed and sold in large quantities two different types of record discs. One is known as the 7-inch, 45 R. P. M. type, marketed and sold by the RCA Victor Division of the Radio Corporation of America, hereinafter referred to as the "RCA record disc" (Fig. 7). The other is known as the 7-inch Columbia, 33 R. P. M. record, and is manufactured and sold by the Columbia Records Incorporated. It will hereinafter be referred to as the "Columbia record disc" (Fig. 8). Both are microgroove records.

The RCA record disc is approximately 7 inches in diameter. It consists of a disc comprising the following: (1) a central circular label area, thickened in cross section, as indicated by the reference numeral 11, Figs. 2 and 7, having a maximum diameter of approximately 3⅝ inches; (2) a stopping groove ring having a width of approximately ¾ inch; (3) a main record groove area or ring having a width of approximately 0.675 inch (for three minutes' playing time); (4) a starting groove ring area having a width of approximately ⅛ inch; (5) a center hole having a diameter of approximately 1½ inches. It will immediately be apparent that a conventional center post such as that indicated by the reference numeral 12 in Fig. 2 is not suitable for securing in position the RCA type of record. In accordance with one feature of the combination embraced by the present invention, there is provided a subcombination of a center post 12 which is suitable for centrally securing a conventional record disc, indicated by the reference numeral 13 in Fig. 6, and a concentric boss 14 of lower elevation which centrally secures the RCA type of record as indicated in Figs. 2, 5, and 9. This boss is lower in elevation than the post 12.

The Columbia type of record disc comprises the following: (1) a central circular label portion approximately 3 inches in diameter; (1–A) substantially adjacent the label area, a "clutch" ring or annular projection about $\frac{3}{16}$ inch wide, having a maximum diameter of about 3⅞ inches, in the form of lands and grooves as indicated by the reference numeral 20 in Figs. 3 and 8, the lands being of greater thickness than and projecting from the remaining portions of the disc; (2) a stopping groove ring approximately ¾ inch in width; (3) a main program or record ring approximately ½ inch in width (for three minutes' playing time); (4) an outer starting groove ring approximately ¼ inch in width; (5) a center hole approximately ¼ inch in diameter. It will be seen that the Columbia type of record is adapted for use with the conventional center post, but it cannot be used with the conventional adapter for large center holes such as those of the RCA type of record. No suitable commercially practicable turntable has heretofore been made available to the public which can be employed with both types of small-diameter records or with those two types as well as the conventional type of record disc.

It is believed that the invention reconciles the conflicting requirements of the successful handling of the three types of records and satisfies an urgent public demand for a single turntable that can successfully be employed, without adjustments, with all of the three types of commercially available record discs.

For a better understanding of the present invention, together with other and further objects, advantages, and capabilities thereof, reference is made to the following description of the illustrative embodiments of the invention disclosed in the drawings. The scope of the invention is clearly defined in the claims appended hereto.

Figures 7, 8, 9, 10:
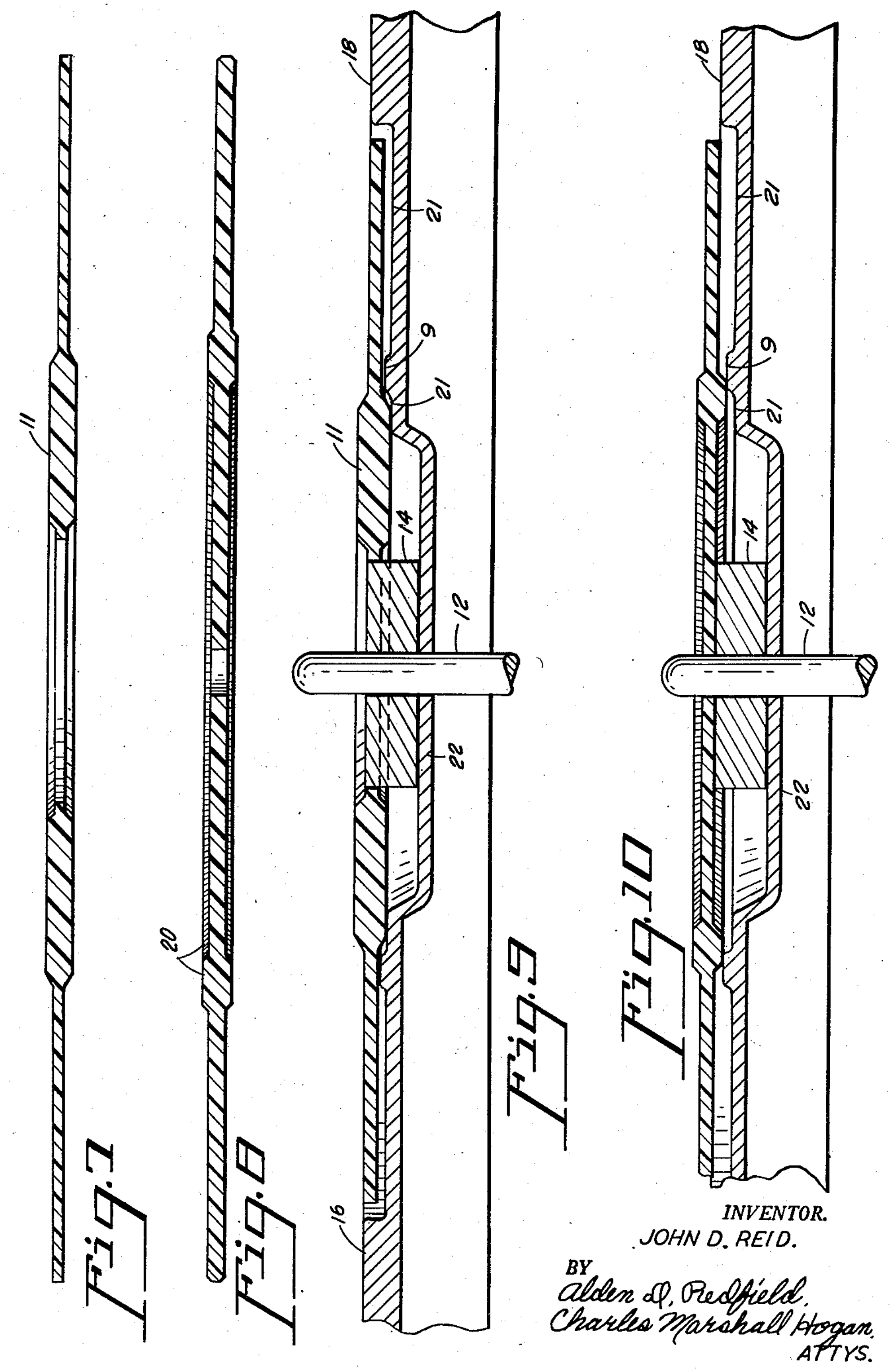
Fig. 7 is an enlarged cross-sectional view of the RCA type of record.
Fig. 8 is an enlarged cross-sectional view of the Columbia type of record.
Figs. 9 and 10 are fragmentary sectional views corresponding to Figs. 2 and 3 and showing certain features in enlarged and exaggerated form.
Figure 11:
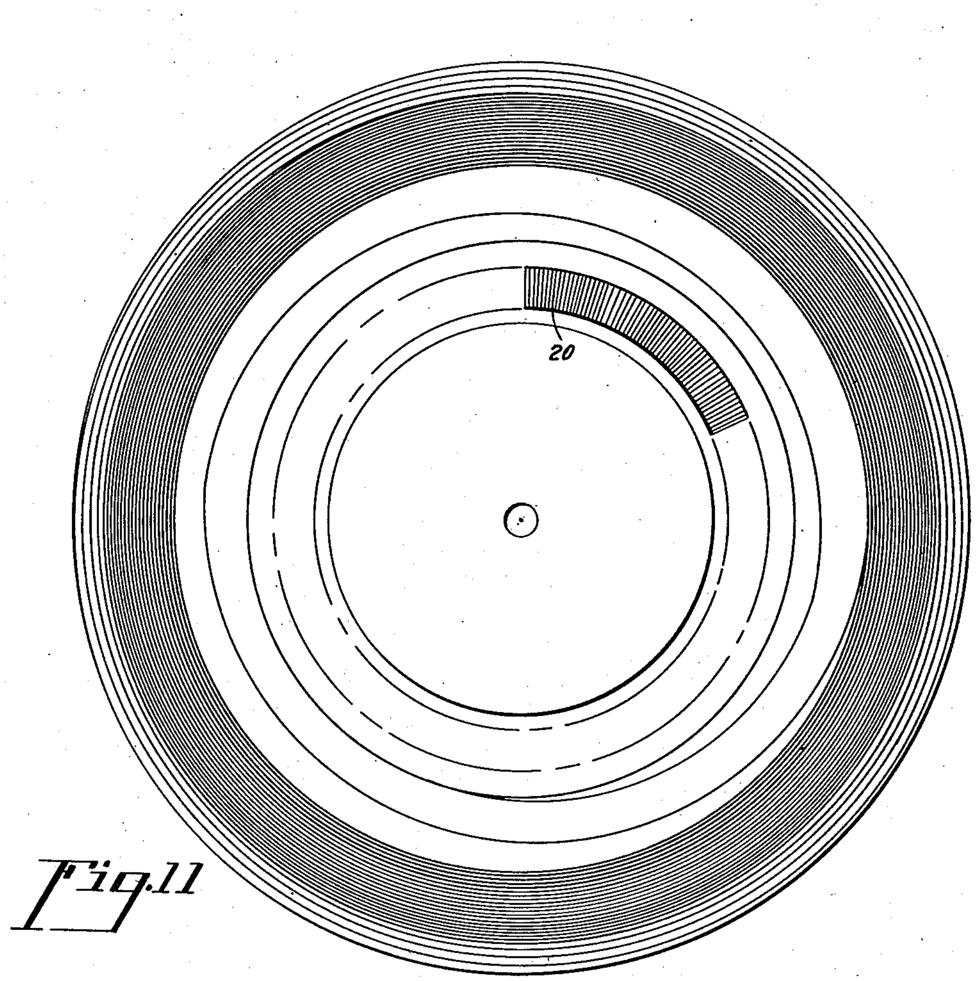
Fig. 11 is a plan view of the Columbia type of record disc, showing one quadrant of the clutching area.
Figures 12, 13:
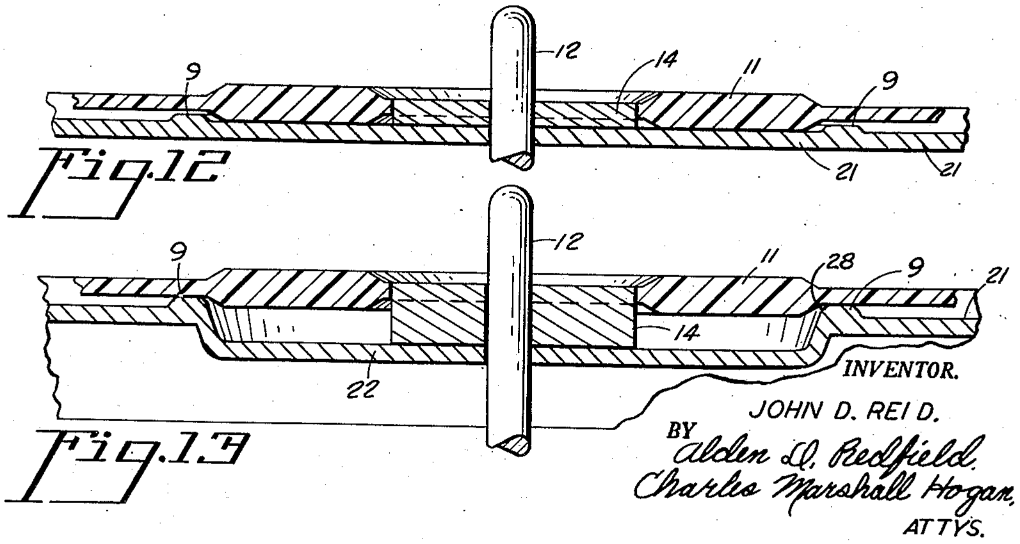

Fig. 12 is a fragmentary sectional view similar to Fig. 9 but omitting the depression 22, this view covering a modified embodiment in which the surface 21 continues to the post 12;

Fig. 13 is a cross-sectional view similar to Fig. 9, relating to an embodiment in which the RCA type of record rests on the pedestal 9, the surface 28 being so rounded out radially inwardly of pedestal 9 as to be spaced from thickened portion 11 of the RCA type of record.

Figure 1:
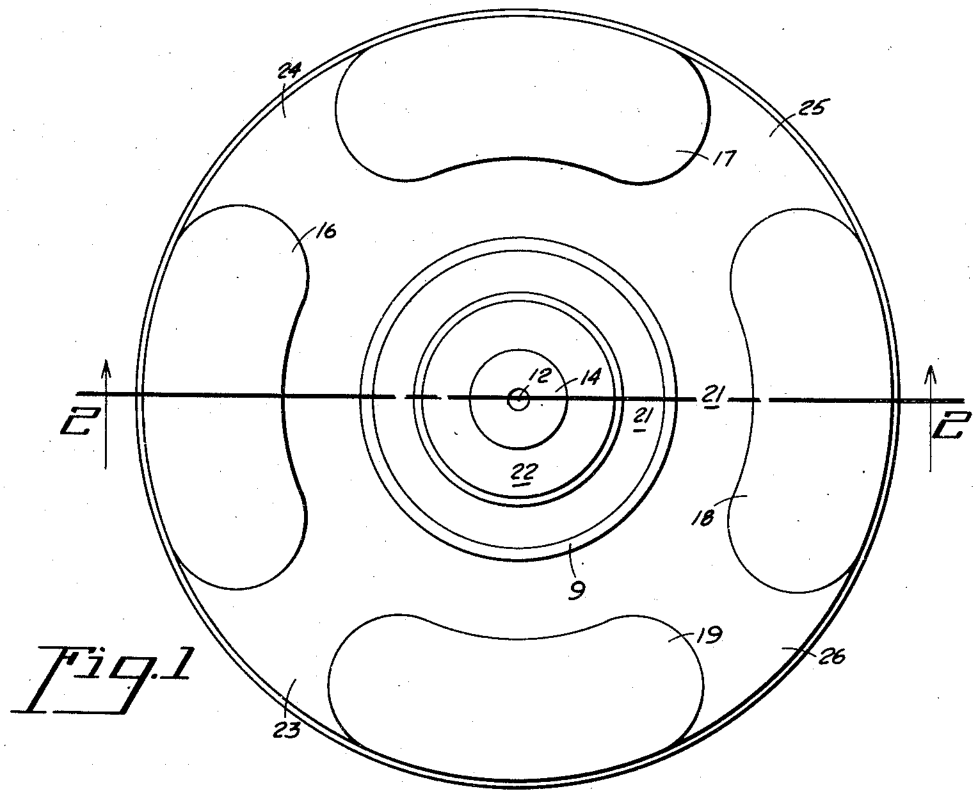
Fig. 1 is a plan view of a preferred form of turntable in accordance with the invention, suitable for handling all three types of records under all conditions of operation.
Figure 2:
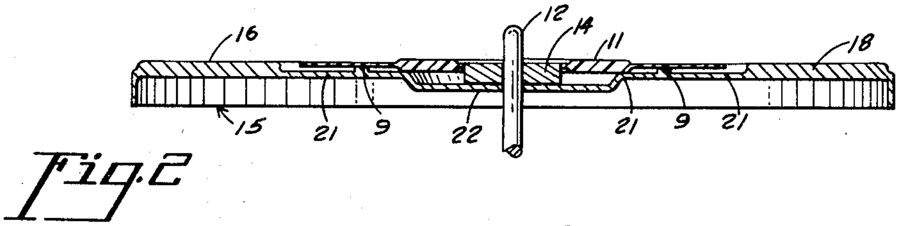
Fig. 2 is a cross-sectional view taken along the line 2—2 of Fig. 1, looking in the direction of the arrows, and showing an RCA type of record in place.
Figure 3:
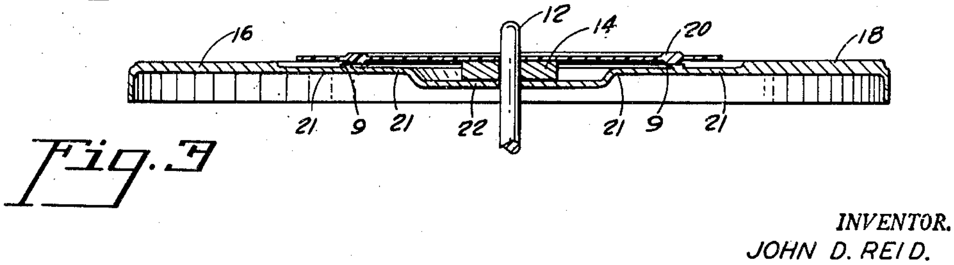
Fig. 3 is a cross-sectional view taken along the same reference line and looking in the same direction, showing a Columbia type of record in place.

Referring now specifically to Figs. 1, 2, and 3 of the drawings, there is shown a novel turntable which is adapted to handle all three types of records. This turntable comprises a circular body member 15, formed generally in similar fashion to the head of a drum, and a conventional axial centering means or center post 12. The functions of the usual turntable for conventional large diameter records, whether 10-inch or 12-inch, are performed by the center post 12 and an outer coaxial pedestal ring or projection located extremely outwardly from and concentric with the center post 12. This annular pedestal may be continuous, but it preferably comprises a series of spaced elevated portions 16, 17, 18, and 19, integral with and projecting upwardly from the body of turntable 15. Concentrically disposed with respect to center post 12 is a circular boss or retainer 14, the top plane of which is common with or at least not higher than the top plane of the outer pedestal portions 16, 17, 18, and 19. It will now be obvious to those skilled in the art that the elements 16, 17, 18, 19, 12, and 14 so far specifically described have the capacity suitably to position, center, retain, stabilize, and support a conventional record disc of 10-inch or 12-inch diameter.

The outer diameter of circular boss 14 is such that it slidably fits within the large center hole of the RCA type of record. The body member 15 is formed with an intermediate ring portion 21, the top plane of which is depressed below the top plane of boss 14 by an amount just sufficient to assure support of the thickened portion 11 of the RCA type of record in such a way that boss 14 will at the same time fit the center hole of that type of record. In the specific embodiment shown in Figs. 1, 2, and 3, the central portion 22 of turntable 15 is depressed below the plane of the ring portion 21, although such depression is not essential, as evidenced by the embodiment shown in Fig. 12. It will be obvious that boss 14 could be of lesser thickness so that portions 21 and 22 could be coplanar.

The spaces 23, 24, 25, and 26 between the pedestal members 16, 17, 18, and 19 provide ready and convenient access to the 7-inch diameter types of records for manually removing them from the turntable.

When the RCA type of record is supported by the turntable, as illustrated in Figs. 2 and 9, the pedestal members 16, 17, 18, and 19 are not utilized. The thickened portion 11 of the record tests on the top plane of the inner ring portion of ring area 21, and the center boss 14 fits into the center hole of the record disc to secure it in place. Thus it will be seen that the invention provides the combination of a small-diameter center post and a turntable symmetrically mounted on said center post and comprising a boss, an outer projection or pedestal ring portion, and an intermediate ring portion between the boss and the outer pedestal portion having an elevation less than that of the boss, whereby the center post, boss, and pedestal cooperate to support and center a conventional type of record and whereby the boss and intermediate ring cooperate to support and center the RCA type of record.

According to an additional feature of the invention, there is provided on turntable 15 an inner pedestal or projection in the form of an integral projecting or raised ring portion 9, the elevation of which meets the following requirements: (1) the top plane of inner pedestal or annulus 9 is lower than the top plane of boss 14; (2) the top plane of ring 9 is higher than the top plane of the intermediate ring portion 21; (3) the top plane of inner pedestal 9 is sufficiently low when an RCA record disc is placed on the turntable (Fig. 9) to permit the bottom of the thickened portion 11 of the record disc to touch the top plane of the inner portion of area 21; (4) the top plane of inner pedestal 9 abuts the bottom of the locking area 20 of the Columbia type record in such a way that records of that type (Fig. 10) are secured against tilting. A Columbia type record is shown in place in Figs. 3 and 10, and it will be seen that its clutching area 20 bears against inner pedestal 9. The area 20 is referred to as a "clutching area" because it is provided with suitable lands and grooves which touch the turntable or an adjoining record disc to prevent slippage. Ring 9 is of greater minimum diameter than the thickened portion 11 of the RCA record disc. An important advantage of the pedestal 9 type of construction will be pointed out in detail in the description of the Figs. 4, 5, 6 embodiment. As shown in Fig. 13, pedestal 9 may also be employed to support the RCA type of record.

Figure 4:
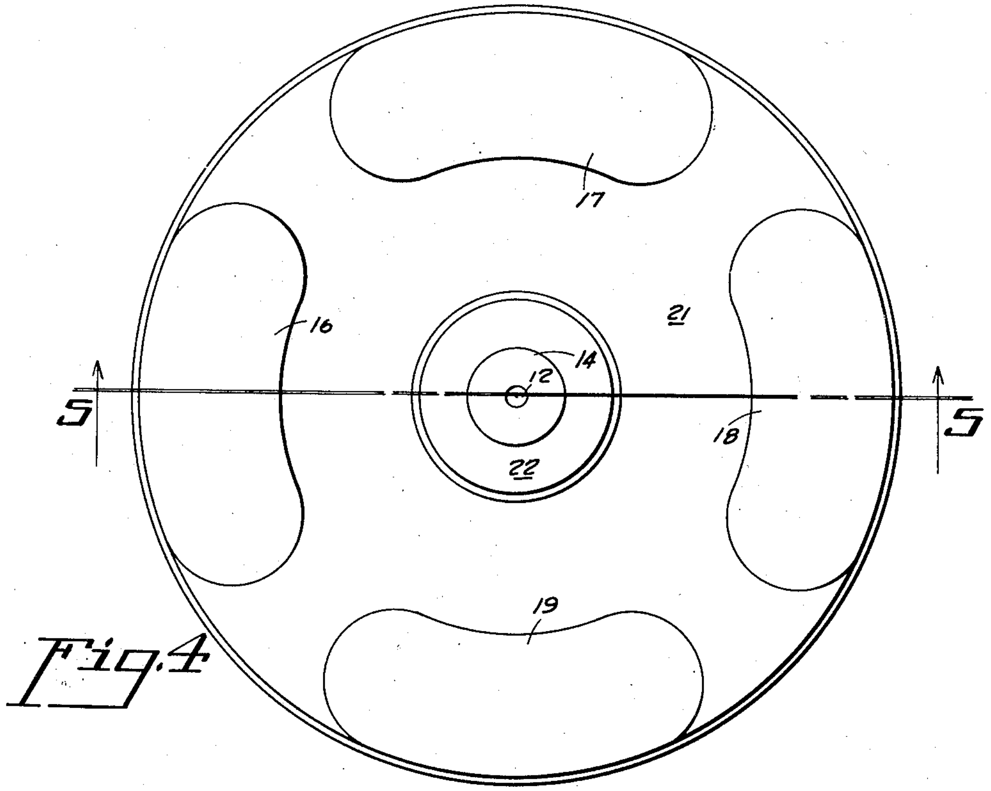
Fig. 4 is a plan view of a modified embodiment of turntable which is suitable for playing all three types of records, but limited in utility with the Columbia type of record by the requirement that a light pickup having a bearing or pressure stress not to exceed 8 grams must be employed.
Figure 5:
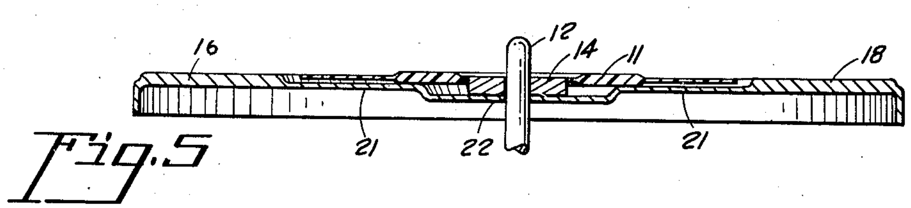
Fig. 5 is a cross-sectional view taken along the line 5—5 of Fig. 4, looking in the direction of the arrows, and showing an RCA type of record in place.
Figure 6:
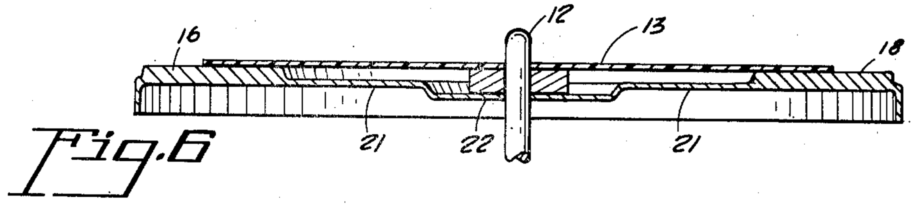
Fig. 6 is a cross-sectional view taken along the same line as Fig. 5 and showing a conventional record disc in place.

Referring now to the modified embodiment illustrated in Figs. 4, 5, and 6, the same reference numerals are employed in designating like elements of both embodiments, so that further description of the function and operation thereof is deemed unnecessary. The latter embodiment differs from Figs. 1 through 3 only in that the inner pedestal 9 is omitted. It will be seen from an inspection of Fig. 5, which shows the conditions during playing of an RCA type record, and Fig. 6, which shows the conditions prevailing during the use of a conventional type record, how this specific embodiment is adapted to use with both those types of records. It has also been found that this embodiment is suitable for use with the Columbia type record provided that the pickup weight does not exceed 8 grams. Weights in excess of that amount tend to cause tilting of the Columbia type record relative to the center post 12 unless the center post has a tight fit to the record. For manual record players this tight-fit condition can be maintained, but for changer operation, where the records must fall down the center post by gravity, the center post must be made smaller than the record hole.

It will be understood that the upper surface of the body member 15 and the various integral portions thereof may be suitably masked and flocked, or otherwise provided with a soft surface of felt or the like. The body member 15 is made of metal or some usual conventional material. The body member and the boss 14 are, of course, securely fitted to the center post 12 by any suitable conventional expedient.

While there have been shown and described what are at present considered to be the preferred embodiments of the present invention, it will be obvious to those skilled in the art that various modifications and changes may be made therein without departing from the true scope of the invention as defined in the appended claims.

Having thus fully disclosed and described my invention, I claim:

1. A phonograph turntable for use with any of the following types of record discs: a large-diameter (10–12 inches), small-center-hole (approximately 1/4 inch) record disc, a small-diameter (7 inches), large-center-hole (1.5 inches) disc having a thickened central circular section, or a small-diameter, small-center-hole disc having a raised clutching ring whose greatest diameter (approximately 3 7/8 inches) is greater than the maximum diameter (approximately 3 5/8 inches) of said thickened section, said turntable comprising a table having an upwardly projecting outer pedestal for supporting a disc of the first type, a central post for retaining either a disc of the first type or a disc of the third type, an upwardly projecting boss having an elevation equal to the elevation of said outer pedestal for retaining a disc of the second type, an intermediate concentric depressed portion having a flat top surface between said boss and said outer pedestal for supporting the thickened section of a record disc of the second type, said boss projecting upwardly beyond said depressed portion, and an inner pedestal projecting upwardly from said intermediate portion and having an elevation less than said boss and said outer pedestal for supporting the clutching ring of the third type of record disc, said pedestal, depressed portion and inner pedestal being integral with said turntable, said post supporting and projecting upwardly through said table and said boss.

2. A phonograph turntable for use with any one of the following types of record discs: a large-diameter (10–12 inches), small-center-hole (approximately 1/4 inch) record disc, a small-diameter (7 inches), large-center-hole (1.5 inches) disc having a thickened central circular section, or a small-diameter, small-center-hole disc having a raised clutching ring whose greatest diameter (approximately 3 7/8 inches) is greater than the maximum diameter (approximately 3 5/8 inches) of said thickened section, said turntable comprising a table having an outer upwardly extending projection for supporting a disc of the first type, an axial post for fitting within a small center hole to retain either a disc of the first type or a disc of the third type, an inner upwardly extending projection having an elevation equal to the elevation of the first-mentioned projection for fitting within a large center hole to retain a disc of the second type, and a third intermediate projection having an elevation less than said inner and outer projections for supporting the clutching ring of the third type of record disc, said third projection having a least diameter greater than the maximum diameter of said thickened section, all of said projections excepting the inner one being integral with said turntable, said post projecting through said table and said inner projection.

3. A phonograph turntable for use with any one of the following types of record discs: a large-diameter (10–12 inches), small-center-hole (approximately 1/4 inch) record disc, a small-diameter (7 inches), large-center-hole (1.5 inches) disc having a central thickened circular section, or a small-diameter, small-center-hole disc having a raised annular ring whose greatest radius (approximately 3 1/16 inches) is greater than the maximum radius (approximately 2 9/16 inches) of said thickened section, comprising a table having an outer pedestal and central boss for supporting a disc of the first type, axial means for centering either a disc of the first type or a disc of the third type, said boss having an elevation equal to the elevation of said pedestal and being adapted to center a disc of the second type, an intermediate portion between said boss and said outer pedestal for supporting a record disc of the second type, said boss projecting upwardly beyond said intermediate portion, and an inner pedestal projecting upwardly and substantially centrally of said intermediate portion and having its least diameter greater than the greater diameter of said thickened portion for supporting the annular ring of the third type of record disc, said pedestals being integral with said turntable.

JOHN DRYSDALE REID.

REFERENCES CITED

The following references are of record in the file of this patent:

UNITED STATES PATENTS

| Number | Name | Date |
|---|---|---|
| 1,436,790 | Bowman | Nov. 28, 1922 |
| 1,690,267 | Barrows et al. | Nov. 6, 1928 |
| 2,416,583 | Hartley et al. | Feb. 25, 1947 |

FOREIGN PATENTS

| Number | Country | Date |
|---|---|---|
| 770,577 | France | Sept. 17, 1934 |